United States Patent [19]
Potemkin

[11] Patent Number: 4,795,289
[45] Date of Patent: Jan. 3, 1989

[54] REAMER

[76] Inventor: Gennady Y. Potemkin, Orekhovy proezd, 19, kv. 19., Moscow, U.S.S.R.

[21] Appl. No.: 934,559
[22] PCT Filed: Mar. 27, 1986
[86] PCT No.: PCT/SU85/00023
  § 371 Date: Oct. 17, 1986
  § 102(e) Date: Oct. 17, 1986
[87] PCT Pub. No.: WO86/05728
  PCT Pub. Date: Oct. 9, 1986
[51] Int. Cl.$^4$ .............................................. B23D 77/00
[52] U.S. Cl. ........................................ 408/80; 407/62; 408/703; 408/229
[58] Field of Search ............... 408/223, 224, 225, 220, 408/221, 227, 228, 229, 230, 703, 231, 704, 705, 80, 81; 407/53, 54, 55, 56, 57, 58, 59, 60, 61, 62, 63, 64

[56] References Cited

U.S. PATENT DOCUMENTS

| | | | |
|---|---|---|---|
| 2,401,307 | 6/1946 | Manewich | 408/229 |
| 4,091,525 | 5/1978 | Karasiewicz et al. | 408/229 X |
| 4,572,714 | 2/1986 | Suzuki et al. | 408/230 |

FOREIGN PATENT DOCUMENTS

| | | | |
|---|---|---|---|
| 512872 | 5/1976 | U.S.S.R. | |
| 804259 | 2/1981 | U.S.S.R. | |
| 1151375 | 4/1985 | U.S.S.R. | 408/277 |

Primary Examiner—Z. R. Bilinsky
Attorney, Agent, or Firm—Burgess, Ryan & Wayne

[57] ABSTRACT

A reamer is provided with teeth (3) having a cutting portion (4) and a smoothing portion (5), wherein at least part of the rear surface of the latter portion is fashioned as a strip. Each tooth (3) has its front angle smoothly decreasing in the direction away from the head portion (6) of the reamer.

2 Claims, 1 Drawing Sheet

REAMER

TECHNICAL FIELD

The present invention relates to tools for machining holes and, more particularly, it relates to reamers.

PRIOR ART

There is known in the art a reamer according to U.S.S.R. Inventor's Certificate No. 804,259 issued on Mar. 13, 1974 and published on Feb. 15, 1981. Said prior art reamer comprises teeth each having a cutting portion and a smoothing portion adjacent one another. In the smoothing portion at least part of the rear surface is fashioned as a strip diverging in the direction away from the head portion of the reamer.

Since the front angle of the reamer tooth has one and the same value over the entire length, said prior art reamer fails to produce the required smoothing effect, this affecting the quality of machining holes, especially, in plastic metals and alloys.

The prior art reamer can only be used to perform preliminary reaming of holes in plastic metals and alloys.

The reaming of holes in other alloys is done to a precision of up to the ninth quality (H9). In so doing, the resulting roughness of the hole surface is $R_1=1.6$ micron.

SUMMARY OF THE INVENTION

The present invention is aimed at solving the problem of developing a reamer wherein the front angle of tooth would be such as to provide for a stable high quality of machining holes in various materials including plastic ones.

The problem is solved owing to the fact that in a reamer with teeth each having a cutting portion and a smoothing portion, with at least part of the rear surface of the latter smoothing portion being fashioned as a strip diverging in the direction away from a head portion of the reamer, and according to the present invention, each tooth has a front angle smoothly decreasing in the direction away from the head portion of the reamer.

Such a tooth design provides for relative ease of cutting in combination with a high smoothing effect on the surface of the hole being machined because the cutting portion of the tooth has an increased front angle $\gamma$ in combination with a positive back angle $\alpha$, owing to which the cutting process is considerably facilitated. As to the smoothing portion of the tooth, the back angle $\alpha=0$ and the minimum values of the front angle $\gamma$ render said portion capable of the smoothing (calibrating) effect, which results in an improved quality of the hole being machined.

It is desirable that the value of reduction of the front angle of the tooth over the entire length thereof be at least 8°.

In case the front angle decreases by less than 8°, the reamer is inacapable of providing a high quality of holes being machined because of the lack of smoothing effect.

BRIEF DESCRIPTION OF THE DRAWINGS

The present invention will be better understood upon considering the following detailed description of an exemplary embodiment thereof, with due reference to the accompanying drawings in which.

BEST MODE FOR CARRYING OUT THE INVENTION

Figure 1:
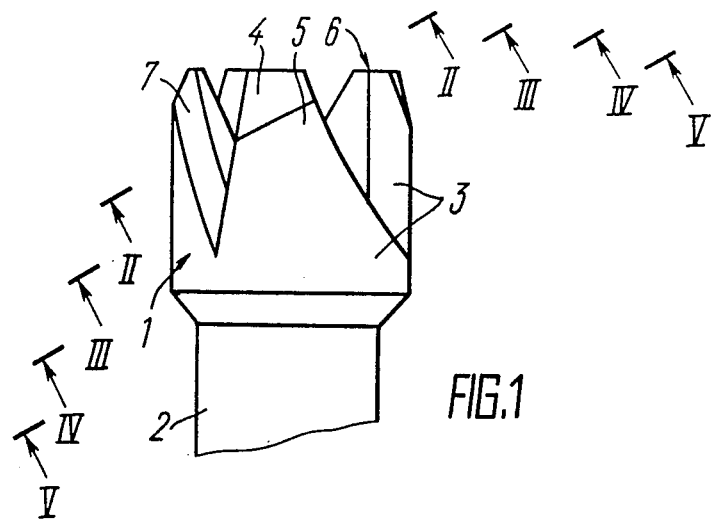
FIG. 1 is a general view of a four-groove reamer, according to the invention (side view, broken-off)

Referring now to FIG. 1 of the accompanying drawings the herein disclosed reamer comprises a working part 1 and a shank 2. Provided on the working part 1 of the reamer are teeth 3 which have a rear surface and a cutting portion 4 and a smoothing portion 5 adjacent one another.

Figure 2:
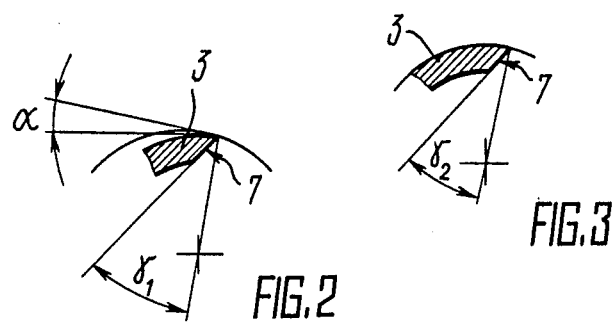
FIG. 2 is a tooth section taken in plane II—II passing through the cutting portion of the tooth.
Figure 3:
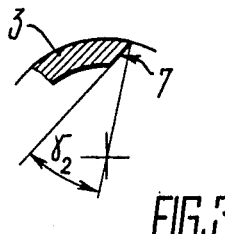
FIG. 3 is a tooth section taken in plane III—III passing through the smoothing portion of the tooth.
Figures 4, 5:
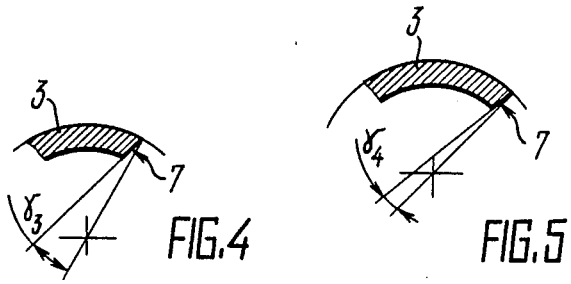
FIG. 4 is a tooth section taken in plane IV—IV passing through the smoothing portion of the tooth.
FIG. 5 is a tooth section taken in plane V—V passing through the smoothing portion of the tooth.

The cutting portion 4 has a positive back angle $\alpha$ (FIG. 2). Rear or back angle $\alpha$ is an angle between the tangent to the rear surface of the blade taken through any cross-section, and a plane which is tangential to the cutting surface and which passes through the blade. It will be appreciated that the back angle $\alpha$ along the entire blade length throughout the smoothing portion thereof will be equal to zero.

At least part of the rear surface of the calibrating portion 5 is fashioned as a strip divering in the direction away from a head portion 6 of the reamer.

Shown in FIG. 1 as a particular case is a reamer wherein the entire rear surface of the smoothing portion 5 presents a smoothly diverging strip. The strip diverges in the direction away from the head portion 6 of the reamer. Each tooth 3 of the reamer has a front surface 7. The front angle of the tooth 3, as shown in FIGS. 2, 3, 4 and 5, decreases smoothly in the direction away from the head portion 6 of the reamer, i.e., $\gamma_1 > \gamma_2$, $\gamma_2 > \gamma_3$, $\gamma_3 > \gamma_4$. In so doing, the value of reduction of the front angle of the tooth 3 over the entire length thereof is at least 8°. Front angle $\epsilon$ is an angle between a tangent to the front surface 7 and a normal to the cutting plane as drawn through the cross-dash section of the blade under consideration, shown in FIGS. 3-5.

The herein disclosed reamer operates in the following manner.

When machining holes using the reamer of this invention, the operation is started by the cutting portions 4 of the teeth 3 whose front angles $\gamma_1$, $\gamma_2$, $\gamma_3$, $\gamma_4$, have the maximum value in the case of a positive back angle $\alpha$.

Owing to this, the cutting process is performed with relative ease, which is of special importance when machining plastic and other like metals and alloys.

The cutting portions 4 are followed by the smoothing portions 5 whose front angles decrease smoothly from $\angle\gamma_1$ to $\angle\gamma_4$ over the entire length of the teeth 3. This means that the smoothing portion 5 which has no positive back angle $\alpha$ and has the minimum value of the front angle, possessing a smoothing ability used to improve the quality of roughness of the surface of the hole being machined as well as the precision thereof. A combination of high cutting and smoothing capabilities in a single tooth enables one to machine holes to a precision of up to the sixth quality (H6) with a surface roughness of up to $R_a=0.2$ microns.

Industrial Applicability

This invention can be used most advantageously in borers, lathes, drills, "building-block" machine tools and in automatic processing lines to produce holes to a precision of up to the sixth quality (H6) and with a surface roughness of up to $R_a = 0.2$ microns.

This invention may also find application for machining precision holes in machines of the machining-centre type.

I claim:

1. A reamer having a body comprising a cylindrical working portion (1) and a shank portion (2), the working portion (1) has a headportion (6) including teeth (3) having a cutting portion (4) and a smoothing portion (5) conjugated with each other, the teeth have a front surface (7) having a rake angle ($\gamma$) which smoothly decreases in a direction away from the headportion (6) and a rear surface which diverges in the direction away from the headportion.

2. A reamer of claim 1 wherein the rake angle decreases by at least 8°.